2 Sheets—Sheet 2.

Sir W. THOMSON, Kt.
Mariner's Compass.

No. 210,069.  Patented Nov. 19, 1878.

Witnesses:
Chas. J. Gooch
W. R. Edelen

Inventor:
Knight Bros.
attorneys for
Sir William Thomson
Knight

UNITED STATES PATENT OFFICE.

SIR WILLIAM THOMSON, KNIGHT, OF GLASGOW, NORTH BRITAIN.

IMPROVEMENT IN MARINERS' COMPASSES.

Specification forming part of Letters Patent No. 210,069, dated November 19, 1878; application filed October 19, 1877.

*To all whom it may concern:*

Be it known that I, Sir WILLIAM THOMSON, Knight, of Glasgow College, Doctor of Laws, and Professor of Natural Philosophy in the University and College of Glasgow, in the county of Lanark, North Britain, have invented certain new and useful Improvements in Ship's Binnacles, of which the following is a specification, reference being had to the accompanying drawings.

This invention relates to an improved method or means for correcting the semicircular, quadrantal, and heeling errors of compasses on board ships.

Within the binnacle a vertical screw is arranged to support and adjust on a central tube a series of movable cradles carrying a series of correcting-magnets. Upon this screw are two circles, carrying a vertical scale for indicating the increment or diminution of the correcting force of the magnets. A brake is secured at one end to the side of the binnacle, the other end engaging with the screw to retard its movement when desired. A vertical scale, for indicating the relative force of the rotating corrector when perpendicular to the direction of the needles, is arranged in a recess in the side of the binnacle. The recess is so made that the scale may be easily read from the outside, and is protected by a glass face. At or near the top of the binnacle are arranged iron balls or globes, adapted to be turned round in azimuth to correct an oblique quadrantal error, or moved inward or outward, and secured in any required position in the slots in which they work.

Figure 1:
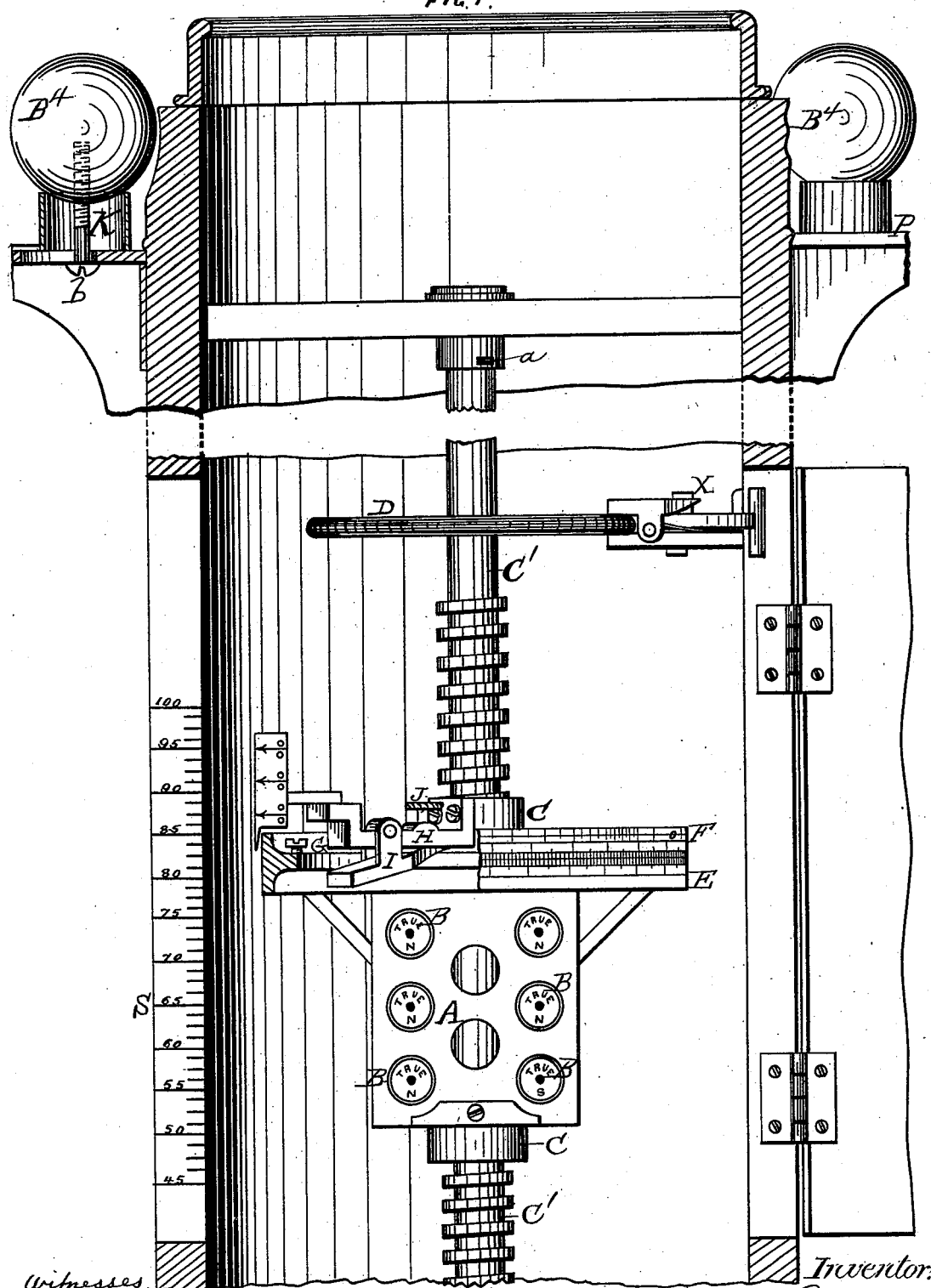
Figure 2:
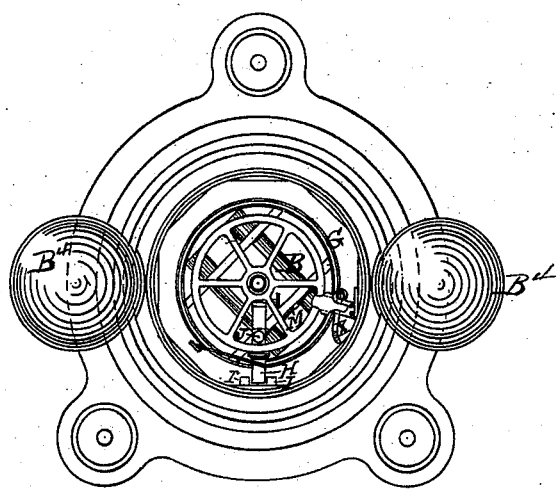
Figure 3:
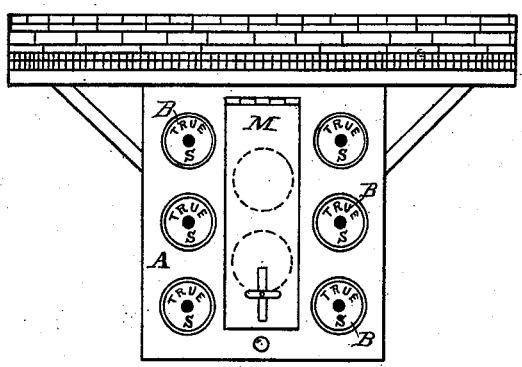

Referring to the drawings, Figure 1 is a sectional elevation of the binnacle, showing the interior fittings thereof. Fig. 2 is a plan of the binnacle, which is circular, with the helmet and compass-bowl removed, showing the magnets and their attachments, which constitute the reflector. Fig. 3 is a detached view of the cradle, showing the hinged shutter.

The corrector-magnets B are mounted in the cradle A, attached to a long nut, C, turning on a screwed tube, C', fixed in the center of the binnacle, said tube containing the heeling-error magnet. The magnets B are secured in the cradle A by the hinged shutter M closing against the ring or belt on each magnet. The cradle is constructed to carry six magnets, B, three on each side of the central tube, and one pair, or two or three pairs, of magnets are used, according to the amount of error to be corrected. The outer vertical edge of the circle E attached to the cradle is divided into degrees—that is to say, from 0 to 360—for the purpose of showing the angular position of the magnets.

To facilitate the adjustment of the compass for any course of the ship, an auxiliary or guide circle, F, is mounted on the circle E. This guide-circle F has two scales upon it—one of degrees from 0 to 360, a second showing 131.7 times the logarithmic cosecants of the corresponding angles. When the compass has been corrected on any particular course, the number representing this course is to be added to the number pointed to by the index on the corrector-circle, and the guide-circle is to be turned round until the index marks the sum, or the sum diminished by three hundred and sixty degrees, if it exceeds three hundred and sixty degrees. The cradle, with the magnets, is moved up or down on the screw, and turned round until it is in the proper position to give a magnetic force on the compass equal and opposite to that produced by the ship's iron.

In moving the corrector to adjust the compass on any other course without disturbing the correction on the previous course, the corrector must be turned round so as to produce the same difference of reading on the second scale of the guide-circle F as is produced on the vertical scale by raising or lowering the corrector.

In a recess in the side of the binnacle a vertical scale is placed, (protected by a window or glass cover,) graduated to show, according to the distance of the corrector from the compass-bowl, numbers indicating the amount of the force exerted by it on the needles. The graduation is such that one division corresponds to a change of $\frac{1}{57}.3$ in the amount of the force. Thus, when the correction is already approximately reached, if the ship be placed so that the force of the corrector is perpendicular to the direction of the needles, and if then the corrector is raised or lowered by one scale-division, the compass is thereby deflected through the same angle as it is by turning the corrector through one degree, when the ship is placed so that the force of the corrector is approximately in the direction of the needles. The circle E is fitted with a horizontal circular rim, G, over which an arm, H, extends, with a clamping-claw under. This arm H is attached to the collar C, upon which the cradle, with the correcting-magnets, is carried, and its outer end is situated between two guides, I, fixed to the interior of the circular binnacle. These guides prevent the arm H from being turned in a horizontal plane, but do not interfere with its freedom of vertical movement. The arm H is provided with a clamping-screw, J, which, being pressed upon the rim G, securely holds the cradle, with the correctors, in any required angular position without interfering with its vertical motion.

To give sufficient strength to the screwed tube C', it is preferably formed of two concentric tubes, with a small space between them. In the upper part of the tube C' a small hole, $a$, is situated, through which one end of a cord or brass chain is passed. To the other end of this cord or chain the heeling-error magnet is attached, so that by means of this cord or chain the position of the magnet within the tube C' is raised or lowered, according to the correction required, and it is fixed in the required position by fastening its cord or chain to a cleat outside the binnacle. On the upper part of the tube C' a hand-wheel, D, is mounted, which enables the screw to be turned round, and thereby give vertical adjustment to the corrector without altering its angular position within the binnacle. This is also provided with a clamp, X, for securing it after the adjustment has been made.

Supported on brackets, or otherwise secured to two sides of the binnacle, are two plates, P, slotted on their faces to receive one end of screws, bolts, or rods $b$, the other ends of which are secured to the soft-iron globes $B^4$. These globes preferably rest on or in collars or cups K, and are arranged to turn in azimuth and slide in the grooves, by means of said screws, bolts or rods, to or away from the binnacle, as desired.

The varying adjustment of the correction required for variation in the ship's sub-permanent magnetism and magnetism induced by the vertical component of the earth's magnetic force I effect in the following manner: One pair of magnets is generally used for the semicircular error; but provision is made in the cradle which carries them for adding a second or third pair of magnets when required. I also use a magnet for correcting the heeling error. The frame in which the semicircular corrector is mounted is fitted on a long screw-nut, C, so as to be capable of being turned round and clamped in any position on a central brass tube, C', formed with a screw-thread on its exterior, and within which tube the heeling-corrector is placed.

A vertical scale, S, at one side of the binnacle, divided with divisions corresponding to equal proportionate increments of force, indicates the degree of power, according to different positions of the edge of a circle or a pointer moving up and down with the slide. A circle, E, carried round with the cradle A, is divided to degrees, so as to indicate the azimuth relatively to the ship's head of the line of the correcting force with which the system of correcting-magnets acts on the compass.

For cases where the ship's iron is not symmetrical, or in which the binnacle is not placed amidships, in order to correct the quadrantal error I use masses of soft iron, (preferably globes $B^4$,) placed with the line joining their centers in an oblique direction, being the line which is magnetic north and south when the ship's head is in such an azimuth as to make the directive force a minimum after the semicircular error has been corrected. This position will be determined either by my method for measuring the horizontal force or by calculation according to the formulæ of the Admiralty Manual, from observation of the residual deviations after the semicircular error has been corrected. For this purpose I may use the same binnacle as that which would serve in the ordinary case of the compass being placed symmetrically with respect to the ship's iron; but before fixing it to the deck I turn it in azimuth until the line joining the center of the globes is in the proper position for correcting the quadrantal error, and I turn the mounting at the top of the binnacle, bearing the gimbals, so as to bring the lubber-line into the proper position; or, allowing the axis of the gimbals to have a position not parallel to the ship's length and breadth, I simply paint the lubber-line in the proper position for the ship's head after the binnacle has been properly set for correcting the quadrantal error; but I prefer to use a round binnacle or a round-topped binnacle carrying a frame of brass or wood, on which the iron globes are to be placed, and which may be turned round to bring them into any required position.

When the ship's iron is symmetrical on the two sides and the ship's compass is placed amidships, the ship's head is put successively on the different cardinal points, as shown by the compass, to be adjusted north, south, east, and west in any order.

The deflector (described in another application) is so adjusted by raising or lowering the magnets by turning the micrometer-screw as to deflect the north point through an angle of eighty-five degrees when the pointer is over the east or west point of the card. This is done for each of the cardinal points and the readings of the deflector noted. When the four readings thus found do not agree there will be either quadrantal or semicircular error, or both.

If, when the ship's head is north, the reading is less (indicating a less directive force in virtue of the ship's magnetism) than when her head is south, the difference shows that the fore-and-aft component of the ship's magnetism is sternward; or, vice versa, if, when the ship's head is north, the directive force on the compass is greater than when her head is south, the fore-and-aft component is headward. To correct this the revolving corrector must be turned and moved on its screw so as to give the requisite headward or sternward force. When this is done the readings with the ship's head north and south for a deflection of eighty-five degrees are the same, and are nearly the mean of the two former readings. Similarly, if, when the ship's head is east the reading is greater than when her head is west, the difference shows that the thwartship component of the ship's magnetism is to port, and the revolving magnetic corrector must be turned and moved on its screw so as to give the requisite thwartship force. When this is done the deflector-readings with the ship's head east and west for a deflection of eighty-five degrees are the same, and are nearly the mean of the two former readings for these points. When the correctors have now been adjusted so that the reading for a deflection of eighty-five degrees when the ship's head is north is the same as when her head is south, and the reading with the ship's head east the same as with her head west, the semicircular error is completely corrected. If, now, the reading when the ship's head is north or south is greater than when the head is east or west, there is a quadrantal error, which is to be corrected by means of the soft-iron globes $B^4$.

When the compass is not placed symmetrically with respect to the ship's iron, the deflector described in another application is to be used with different bearings of the ship's head, so as to find the bearings which give the maximum and minimum directive force of the ship's magnetism after the directive force has been equalized on two pairs of opposite bearings by the magnetic correctors, and then the iron globes are to be applied on the two sides of the compass, with their centers in the direction which was magnetic north and south when the directive force was minimum, and at the proper distance to correct the quadrantal error, which is found, either by trial or by theory, from the known amount of the quadrantal error.

When the ratio between the horizontal force on shore and the horizontal force on board any ship is known, and when the quadrantal error has been corrected, the semicircular error may be corrected by means of the aforesaid deflector without the necessity of moving the ship, provided the true bearing of the ship's head be known.

From mathematical reasoning and from experiments it is found that the ratio between the horizontal force on board and the horizontal force on shore (called "$\lambda$" in the Admiralty Compass Manual) remains the same for the same ship, so that, having once found this ratio for any ship, the compass can very easily be corrected at any time without swinging the ship.

Having thus described my invention, what I claim, and desire to secure by Letters Patent, is—

1. The cradles A, corrector-magnets B, screwed tube C', having orifice $a$ at its upper part for affording communication with the heeling-magnet, nut, or collar C, hinged shutter M, hand-wheel D, and clamp X, as and for the purpose set forth.

2. The circle E, divided into degrees for indicating the amount of deflection of the compass-card obtained by the raising or lowering of the corrector in the manner set forth.

3. The auxiliary or guide circle F, mounted on the circle E, and having two scales thereon for indicating the corrective force of the magnets, as set forth.

4. The vertical scale S, for indicating the increase or diminution of the corrective force applied by the raising or lowering of the corrector-magnets, as set forth.

5. The iron balls or globes $B^4$, secured near the top of the binnacle, and adapted to turn in azimuth and slide toward or away from the binnacle, as set forth.

6. The arm H, arranged between guides I, to prevent horizontal movement thereof, and carrying clamping-screw J, for clamping the rim G of circle E and holding the cradle and correctors in any angular position, substantially as specified.

In witness whereof I have signed my name to this specification in the presence of two subscribing witnesses.

WILLIAM THOMSON.

Witnesses:
 ST. JOHN VINCENT DAY,
 DAVID DRYSDALE AUSTIN.